United States Patent [19]

Carpenter

[11] 4,014,168

[45] Mar. 29, 1977

[54] ELECTRICAL TECHNIQUE

[76] Inventor: Donald G. Carpenter, Box 62 A, North Granby, Conn. 06060

[22] Filed: May 30, 1974

[21] Appl. No.: 474,379

Related U.S. Application Data

[63] Continuation of Ser. No. 95,754, Dec. 7, 1970.

[52] U.S. Cl. .................................. 60/202; 313/309; 313/351; 315/111.3

[51] Int. Cl.² .......................................... F02K 9/00

[58] Field of Search ............... 60/202, 203; 417/48; 244/12, 62; 250/49.5 GC; 315/111.2, 111.3; 313/307, 351

[56] References Cited

UNITED STATES PATENTS

| | | | |
|---|---|---|---|
| 3,095,163 | 6/1963 | Hill | 417/48 |
| 3,120,363 | 2/1964 | Hagen | 244/62 |
| 3,177,654 | 4/1965 | Gradecak | 60/202 |
| 3,223,038 | 12/1965 | Bahnson | 60/202 |
| 3,322,374 | 5/1967 | King | 244/62 |
| 3,418,500 | 12/1968 | Davis | 417/48 |
| 3,552,125 | 1/1971 | Banks | 60/202 |

*Primary Examiner*—William L. Freeh
*Assistant Examiner*—Robert E. Garrett
*Attorney, Agent, or Firm*—J. P. Sinnott

[57] ABSTRACT

Typical embodiments of the invention can be used for photon generation, plasma containment or for atmospheric and/or space vehicle propulsion. Illustratively, a large dome of insulating material supports an array of smaller insulating domes. Conducting electrodes that are embedded in the external surfaces of these smaller domes are coupled to a high frequency alternating current. The electrical potential on these electrodes produces ionization in the medium external to the dome array. The ions, charged with a potential that is the same as electrode voltage, are repelled from the dome array in a preferred direction. This action establishes a resultant force that can be used to drive the array through the medium in a direction opposite to that of the ions. The ionization phenomena produced in accordance with the described technique also generates abundant photons.

10 Claims, 3 Drawing Figures

DONALD G. CARPENTER
INVENTOR

ELECTRICAL TECHNIQUE

This is a continuation of application Ser. No. 95754, filed Dec. 7, 1970.

BACKGROUND OF THE INVENTION

1. Field of the Invention

This invention relates to ionization techniques and, more particularly, to a method and apparatus for imparting motion to ions and ionizable matter, and the like.

2. DESCRIPTION OF THE PRIOR ART

Various systems for extracting thrust for space vehicles from ion beams have been proposed. All of these proposals, however, have necessarily relied on the application of a direct current to some portion of an ionizable material that is carried aloft in the vehicle. Clearly, a device of the foregoing sort requires a mechanism for supplying ionizable matter to an ion generator at some preestablished rate. An ion accelerator is needed to impart motion to these ions in order to produce the required reactive thrust for the space vehicle.

In other fields, of which plasma physics and controlled fusion reactions are typical, a need exists to force ions to move or migrate in some preferred direction. For instance, it may be necessary to contain ions within or exclude them from a particular volume. In this regard, controlled fusion "mirror" devices of which "Tabletop" is typical, experience charged particle leakage through the mirror regions. These "mirror" devices are well known to plasma physicists and a typical "mirror" system is described on page 214 et seq. of the text *Nuclear Fusion*, D. Van Nostrand Company, Inc., Princeton, New Jersey, 1960, edited by William P. Allis. This loss tends to degrade the plasma concentration within the device and thereby result in an unsuitable, low efficiency system.

There is a further need in fusion technology to have a relatively uncomplicated means for effectively heating plasma to a high level of excitation.

Photons, or gamma rays, are frequently used for industrial purposes. Ordinarily, radioactive isotopes (cobalt 60, for example) or X-ray machines provide the source of radiation needed for the purpose in question, be it for medical uses or for some other purpose. The energy and intensity of this emitted radiation, however, is determined by the characteristics of the isotope or the "target" within the X-ray machine. It should be noted in this regard, that X-ray machines also are direct current devices, inasmuch as they rely on the impact of an electron beam on the target to produce the desired radiation output.

SUMMARY OF THE INVENTION

In accordance with the principles of the invention, the foregoing needs are satisfied to a large extent. In this connection, an alternating current is applied to the matter in a medium surrounding an electrode array. The high voltage gradient produces ionization in the medium, the ions being repelled by the like charge on the electrodes. The electrode orientation necessarily causes the repelled ions to move or migrate in a preferred direction. There are, of course, many practical uses for their phenomenon.

For example, by positioning an electrode array that embodies the principles of the invention at a mirror point in a controlled fusion mirror device, some of those charged particles that ordinarily would leak through the mirror region are forced in an opposite direction. In this manner, plasma confinement is enhanced and fusion device efficiency is improved. The energy imparted to the ions by the alternating current at the electrodes also can be used as a very efficient system for producing a plasma and heating or exciting it to a higher average energy level or temperature.

If the electrode array is mounted on a suitable vehicle, the reaction force or thrust that must accompany the ion repulsion can be used to drive the vehicle through the atmosphere, space or other medium exterior to the device.

In producing the ions in question, electrons are liberated. These electrons may be attracted to the electrode array where they are attenuated and, if sufficiently energetic, produce a type of gamma radiation known as "Bremsstrahlung" radiation. Interaction of the electrons with nuclei of the medium will also produce "Bremsstrahlung". Operation of the device in accordance with the invention also may produce other sources of photons or gamma rays as, for example, through chemical recombination, de-ionization and de-excitation. Radiation production through these other mechanisms, however, depends to a great extent on the density and particle composition of the plasma.

Perhaps one of the basic features of the invention is characterized by the significant improvement that an alternating electrical field can provide when it is applied to processes of which the foregoing is typical. The prior art, in contrast, generally relied on some direct current electron or ion beam technique that necessarily lead to a number of technical and economic disadvantages, a few of which are enumerated above.

More specifically, a typical embodiment of the invention for high altitude vehicle operation may have a dome that is formed of an insulating material. Preferably, the dome has a radius that is on the order of 100 meters. A number of one meter radius domes, also formed of an insulating material, are mounted on the larger dome. Electrically conducting hemispheres, each having a diameter of about two centimeters (cm) protrude from the exterior surface of each of the smaller domes. These conducting spheres are mounted on the surface of the smaller domes with about a 10 cm center-to-center spacing.

The surface of each of the conducting spheres, moreover, has a group of three right circular cones with radii of about 0.1 cm and heights of about 0.3 cm. The cones also are electrically conductive. They are arranged on the hemispherical surface about 120° apart in a plane that is essentially parallel to a plane tangent to the smaller dome at the center of the hemisphere.

Appropriate connections are established to couple about 100 kilovolts at a frequency of 200 megahertz to each of the hemispheres. Depending on the density and electrical state of the medium exterior to the electrode array, a current on the order of 25.0 milliamperes should be supplied to each electrode.

In accordance with another aspect of the invention, it has been found that ionization efficiency (and hence, vehicle thrust and photon generation) varies in accordance with the plasma density and the power frequency. Consequently, the power supply output should be able to vary through a range of about $10^3$ hertz, the higher frequencies being used in dense atmosphere, the lower frequencies being used in or near space or high vacuum conditions. Ion production is related to the electrode current, a current of 50.0 ma for each electrode being near the preferred maximum.

For a more detailed understanding of the invention, attention is invited to the accompanying drawing and the following description.

DESCRIPTION OF THE PREFERRED EMBODIMENTS

Figure 1:
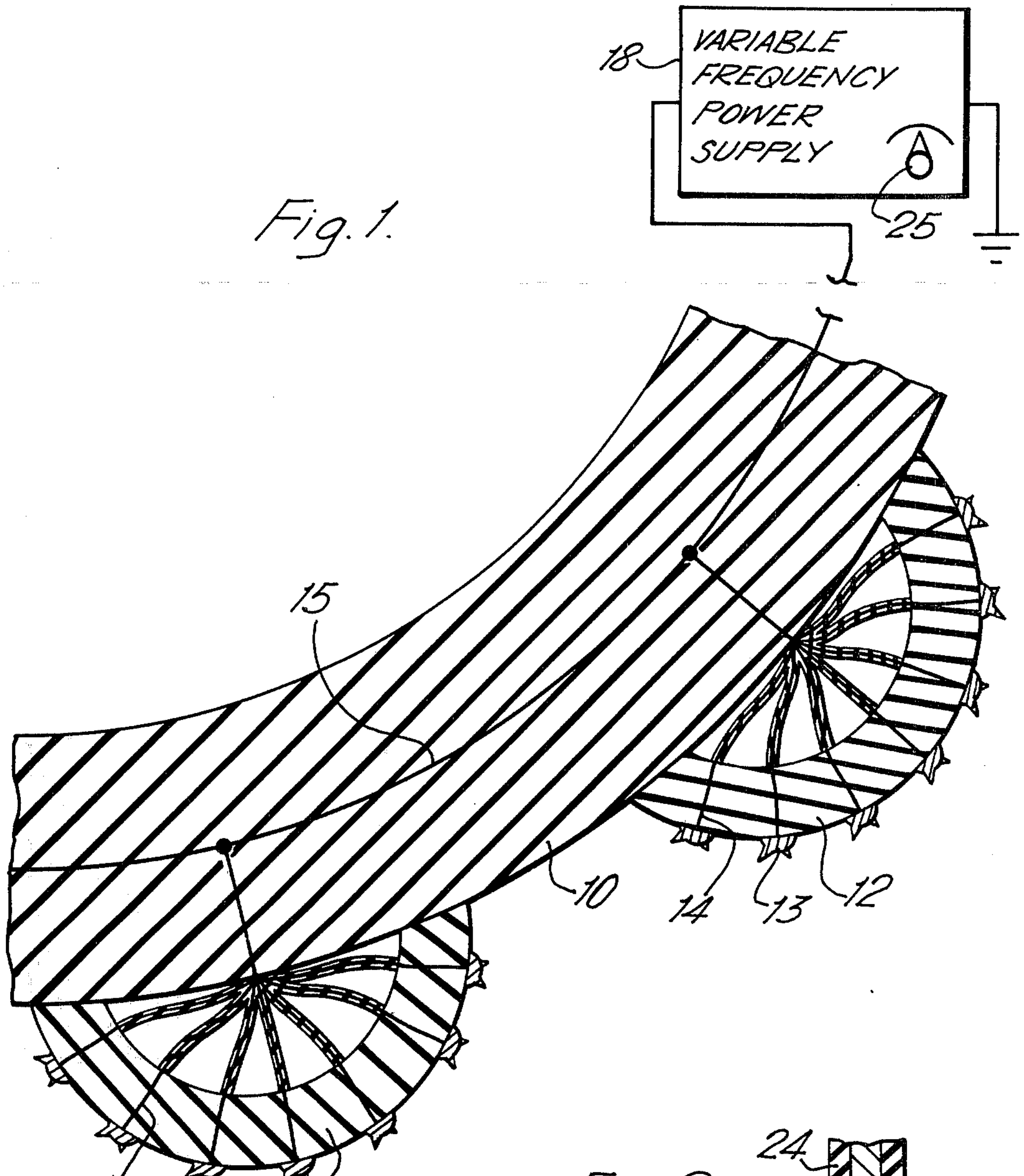
FIG. 1 is a schematic diagram in full section of a portion of an illustrative embodiment of the invention, not drawn to scale.

For a more complete appreciation of the invention, FIG. 1 shows a portion of a dome 10 formed of an electrical insulating material of which rigid vinyl chloride, glass bonded mica, polystyrene molding, and anilene formaldehyde resin are illustrative of the materials suitable for use with the structure shown. The insulation from which the dome 10 is formed, ought to be about 0.2 meter thick.

The dome 10 may be connected to a space vehicle (not shown) in order to provide propulsive thrust, or used, for example, in connection with a plasma generator, fusion apparatus or photon generator. Preferably, the dome 10 has an external radius of about 100 meters and has a suitably rigid structure to support not only the gross weight of the device when on the ground, but also to withstand flight forces and propulsive thrust. Also, dome 10 should be mechanically supported at various positions on the concave side of the dome.

Two smaller and similar domes 11 and 12, are illustrative of a group of smaller domes that are distributed over the external surface of the large dome 10. Typically, the domes 11 and 12 might have a 2.5 meter center-to-center spacing. The smaller domes 11 and 12 have outside radii on the order of one meter and may be hemispherical in shape or, preferably, even may be lesser portions of a sphere. The smaller domes 11 and 12 also are formed of an electrically insulating material of which rigid vinyl chloride and glass bonded mica are typical. They are suitably secured to the larger dome 10 and have sufficient structural integrity to withstand their proportionate share of flight stresses. Illustratively, the mechanical strength of the smaller domes should be at least 2½ times greater than the stresses imposed by hemispherical electrodes 13, which will be described subsequently in more complete detail. The dielectric strength of the small domes insulating material should be able to withstand a potential of at least 200 kilovolts per centimeter before breakdown. A thickness of 6 cm or more also is preferred.

The hemispherical electrodes 13, embedded in respective small domes on about 10 cm center-to-center separations are formed of an electrically conductive material of which copper is typical. Electrical power is fed to the electrodes 13 through waveguides or other suitable conductors 14 from a bus 15 that is connected to a variable frequency power supply 18.

Figure 2:
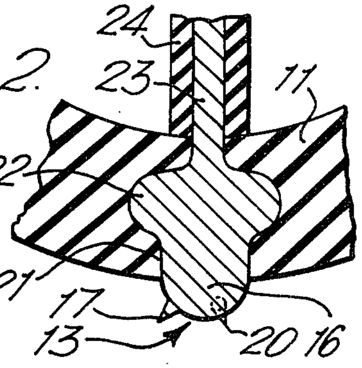
FIG. 2 is a magnified drawing of a typical electrode suitable for use with the embodiment of the drawing shown in FIG. 1
Figure 3:
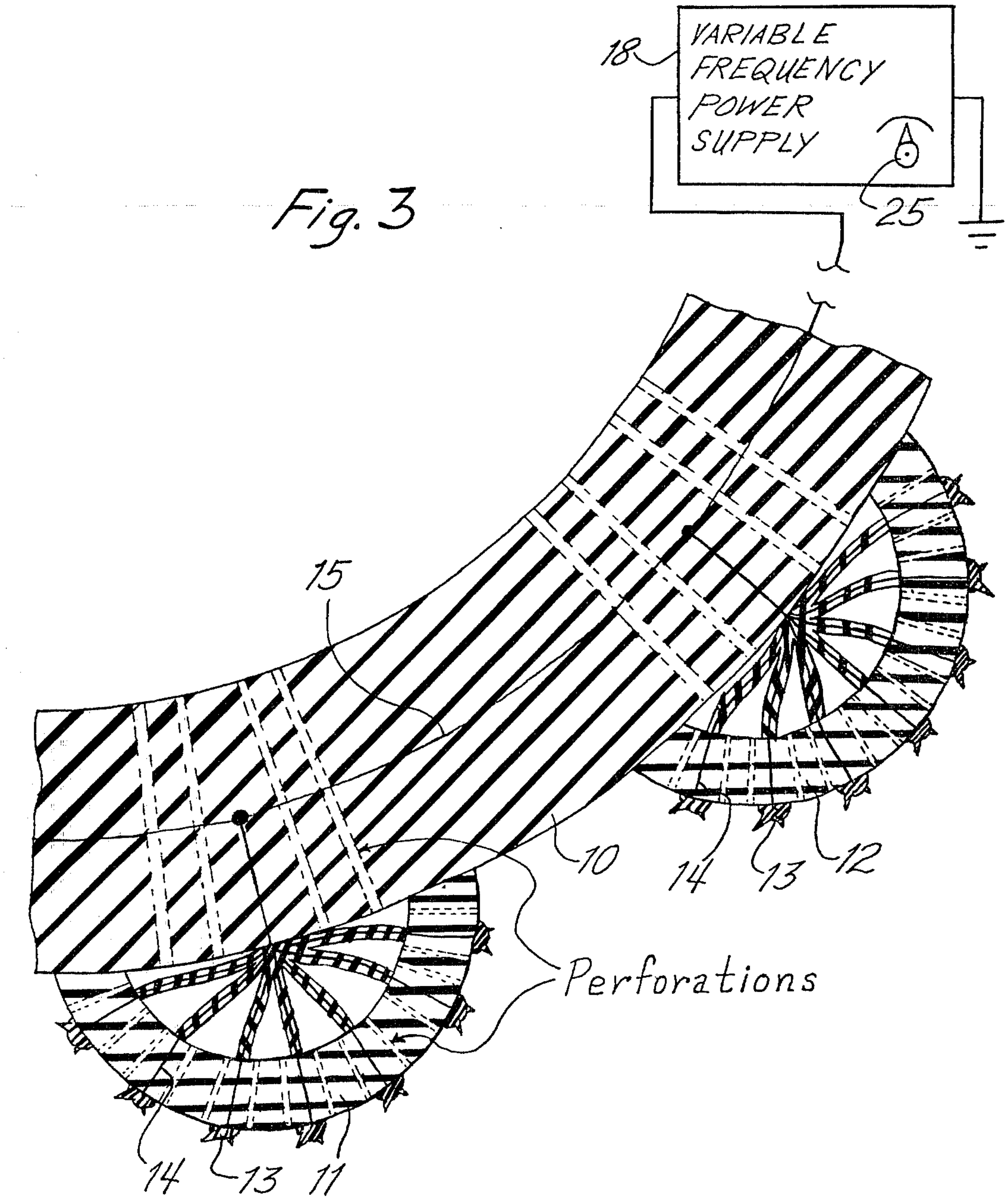
FIG. 3 is a schematic diagram of a further embodiment of the invention.

As shown in FIG. 2, an illustrative electrode 13 has an electrically conducting hemispherical portion 16 that protrudes from the external surface of the associated dome 11. Three electrically conducting right circular cones 17 and 20 (one of which is not in the plane of FIG. 2 projection and hence not shown) also are formed on the protruding surface of the hemispherical portion 16. By way of example, the conducting hemispherical portion may have a diameter of 2 cm. As hereinbefore mentioned, the longitudinal axes of the three cones, only the cones 17 and 20 of which are shown, are spaced 120° from each other in a plane that is parallel to a plane tangent to the surface of the dome 11 at the point of intersection with the center of the hemispherical portion 16. These longitudinal axes, moreover, form a 60° angle with the plane of tangency. Preferably, each cone has a base radius of 0.1 cm and an height of 0.3 cm.

Extending from the hemispherical portion 16 into the dielectric matrix that forms the smaller dome 11 is a conducting cylinder 21 that has an height of about 0.5 cm and a 2 cm diameter. The cylinder 21 terminates in a bulbous section 22 that has a diameter of about 3 cm. Suitable transition rounds are provided in order to establish a smooth juncture between the cylinder 21 and the bulbous portion 22. In this regard, radii of about 0.5 cm provide a suitable fillet at the plane of intersection.

The bulbous section 22 serves to anchor the entire electrode 13 in the insulator matrix of the smaller dome 11. This structural feature of the invention provides the necessary strength to withstand the stresses that ionization will apply to the electrode during operation in a space vehicle, a laboratory instrument or other application.

Further transition rounds lead from the bulbous section 22 to another conducting cylinder 23. The cylinder 23 has a diameter of about 1 cm and is encased in a dielectric cylinder 24 that preferably is formed of rigid vinyl chloride or some similar material.

As described in connection with FIG. 1, the conducting cylinder 23 is electrically coupled to the power supply 18. It has been found, moreover, that an alternating current frequency of about 200 kilohertz is best for system operation in space, where the medium has a density of about 10 particles per cubic cm. Near the earth's surface, however, the more dense atmosphere will require a frequency in the range of 200 megahertz. Intermediate frequencies are, of course, required during passage from the more dense atmosphere to space.

Accordingly, a bank of variable frequency shielded grid triodes (TV TX) or other high frequency power source can be used to provide the necessary electrode current through the frequency range in question. For applications other than in flight propulsion, different frequencies may be desired. A generally applicable tube is RCA No. 7835 which has a frequency range of 150 Mhz to 300 Mhz with an average power of 300 kw and a maximum plate voltage of 60 kv. Used with a 2041 (tetrode) driver, the output stage could be a push-pull arrangement with a step-up transformer.

In operation, near the earth's surface, a current of about 25.0 milliamperes is applied to each of the electrodes 13 (FIG. 1). Although alternating current has been used throughout this text, any suitable waveform can be applied to the electrodes 13. For instance, square, sawtooth and sinusoidal waveforms that have lobes of opposite polarity or do not cross the zero voltage axis can be used in connection with the invention. The waveform may be continuous, or interupted as in the case of pulse mode operation.

The potential gradient established by the electrodes 13 cause spark discharges between the electrodes and the surrounding medium that ionizes the surrounding medium. The electric field drives the ions away from the similarly charged electrodes 13. Electrons, liberated in the ionization, are either drawn to the electrodes and there, quickly attenuated (emitting the aforementioned Bremsstrahlung radiation), or are driven away from the electrodes as are the ions.

As the power supply frequency is decreased, for the purpose of illustration through manipulation of a frequency control knob 25, the propulsive thrust increases until a frequency is reached below which the force decreases. As previously considered, this frequency depends on the density of the plasma created by the ionization process. In the lower troposphere, near the earth's surface, each of the hemispherical portions 16 (FIG. 2) probably will be surrounded by an individual glow. The glow should spread with increasing altitude and decreasing power supply frequency until the individual glows merge.

Although the invention has been described in connection with a flight propulsion system, as noted before, the principles of the invention can be applied to many ordinary industrial uses, of which plasma, fusion, and X ray techniques are only illustrative.

For flight operation within an ionizable medium that is either not ionized or only partially ionized, the insulating material can be perforated to permit a more steady supply of the un-ionized, but ionizable, portion of the medium to approach the electrodes, to be ionized, and to be embodied in the reaction mass.

I claim:

1. An ionization system comprising an electrically insulating dome, a plurality of electrodes embedded in said dome and having protruding hemispherical portions, a plurality of cones protruding from each of said hemispherical portions, and conductor means for coupling power to said electrodes.

2. A system according to claim 1 wherein said electrodes further comprise each a respective bulbous portion embedded within said insulating dome.

3. A system according to claim 1 further comprising a large dome formed of insulating material for supporting a plurality of said electrode bearing dome thereon.

4. A system according to claim 3 further comprising a power supply for coupling current in the frequency range of 200 kilohertz to 200 megahertz to said electrodes.

5. An electrode for an ion generator comprising an hemispherical portion, a plurality of cones protruding from said hemispherical portion, a first conducting cylinder joined to said hemispherical portion, a bulbous section, transition rounds joining said conducting cylinder to said bulbous section, and a second conducting cylinder joined to said bulbous section on the side opposite to said first conducting cylinder and in axial alignment therewith.

6. A method for generating ions in a medium of changing density comprising the steps of applying an alternating current through a plurality of electrodes to the medium, varying the frequency of said current to produce a glow, increasing said alternating current frequency as the density of the medium increases, and decreasing said alternating current frequency as the density of the medium decreases.

7. A method according to claim 6 wherein said frequency increasing step comprises increasing said frequency to a maximum that is on the order of 200 megahertz.

8. A method according to claim 6 wherein said frequency decreasing step comprises decreasing said frequency to a minimum that is on the order of 200 kilohertz.

9. A controlled fusion device that has a mirror point comprising an electrically insulating dome associated with the mirror point, at least one electrode embedded in said dome and having a protruding hemispherical portion, a plurality of cones protruding from said hemispherical portion, and conductor means for coupling power to said electrode.

10. An ionization system according to claim 1 wherein said insulating dome further comprises an insulating material, said material having perforations formed therein for enabling said plurality of electrodes to establish ionization.

* * * * *